United States Patent

(12) United States Patent
Wang

(10) Patent No.: US 8,787,320 B2
(45) Date of Patent: Jul. 22, 2014

(54) WIRELESS COMMUNICATION SYSTEM AND RELATED METHOD THEREOF

(75) Inventor: Ya-Ying Wang, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 164 days.

(21) Appl. No.: 13/176,759

(22) Filed: Jul. 6, 2011

(65) Prior Publication Data

US 2012/0008606 A1 Jan. 12, 2012

(30) Foreign Application Priority Data

Jul. 8, 2010 (TW) ................................ 99122450 A

(51) Int. Cl.
H04W 4/00 (2009.01)
H04W 72/08 (2009.01)

(52) U.S. Cl.
CPC ................................... *H04W 72/08* (2013.01)
USPC ........................................................ 370/332

(58) Field of Classification Search
USPC .................... 370/310–349, 431–464
See application file for complete search history.

(56) References Cited

U.S. PATENT DOCUMENTS 8,116,684 B2 * 2/2012 Gao et al. ...................... 455/41.2
8,284,721 B2 * 10/2012 Chen et al. .................... 370/329
8,340,578 B2 * 12/2012 Tolentino et al. ............ 455/41.2
2006/0030265 A1 2/2006 Desai et al.
2007/0047625 A1 * 3/2007 Klomsdorf et al. ........... 375/141
2008/0254745 A1 10/2008 Zhang et al.
2010/0040121 A1 * 2/2010 Duerdodt et al. ............. 375/219
2011/0007675 A1 * 1/2011 Chiou et al. .................. 370/297
2011/0090982 A1 * 4/2011 Chen et al. .................... 375/285
2011/0149920 A1 * 6/2011 Liu et al. ....................... 370/336

FOREIGN PATENT DOCUMENTS

CN 1741484 A 3/2006

OTHER PUBLICATIONS

English Abstract translation of CN1741484 (Published Mar. 1, 2006).

* cited by examiner

Primary Examiner — Kwang B Yao
Assistant Examiner — Juvena Loo
(74) *Attorney, Agent, or Firm* — McClure, Qualey & Rodack, LLP

(57) ABSTRACT

A wireless communication system includes a first wireless device, a second wireless device, a determining device and an executing unit. The first wireless device is arranged for receiving a first signal, and the second wireless device is arranged for transmitting a second signal, where the first wireless device and the second wireless device conform to different communication standards, respectively. The determining device may determine a signal quality of the first signal received by the first wireless device, and accordingly generates a determining result. The executing unit refers to the determining result to select a target coexistence mechanism, which is shared by the first and second wireless devices, from a plurality of candidate coexistence mechanisms.

17 Claims, 3 Drawing Sheets

WIRELESS COMMUNICATION SYSTEM AND RELATED METHOD THEREOF

BACKGROUND OF THE INVENTION

1. Field of the Invention

The present invention relates to a wireless communication system, and more particularly, to wireless communication system with coexistent blue-tooth device(s) and wireless LAN device(s).

2. Description of the Prior Art

Fueled by various kinds of information with embedded wireless functionality and consumer and communication products, wireless LAN technologies (such as, 802.11b/g) and blue-tooth technology have their good developments in wireless communication markets, respectively. However, both of the 802.11b/g technology and blue-tooth technology adopt 2.4 GHz as their frequency band (which belongs to an ISM frequency band without a license). Although they adopt different modulations and spread spectrum technologies from each other, a mutual interference will occur so as to affect transmission rates of each other if the wireless transceiver scopes of two devices are overlapped.

Presently, conventional coexistence mechanisms include an adaptive frequency hopping (AFH) coexistence mechanism, a channel skipping coexistence mechanism, a time division multiplexing (TDM) coexistence mechanism, and a hybrid coexistence mechanism. Those skilled in the art should be able to easily appreciate the operations of the abovementioned coexistence mechanisms, and further description is omitted here for brevity. However, the wireless communication system needs to spend more time to be stable for some of the coexistence mechanisms, and some of the coexistence mechanisms may have disadvantages of sacrificing the transfer rate of one wireless device and allowing the transfer of one wireless device only. Hence, how to make the wireless LAN device and the blue-tooth device to transmit and receive signals simultaneously and maintain a good transfer rate have become an important topic of this field.

SUMMARY OF THE INVENTION

It is therefore one of the objectives of the present invention to provide a wireless communication architecture for determining the target coexistence mechanism based on a signal receiving quality of the received signals to solve the abovementioned problems.

According to an exemplary embodiment of the present invention, a wireless communication system is provided. The wireless communication system includes a first wireless device, a second wireless device, a determining device, and an executing unit. The first wireless device is arranged for receiving a first signal. The second wireless device is arranged for transmitting a second signal, wherein the first wireless device and the second wireless device conform to different communication standards, respectively. The determining device is coupled to the first wireless device, and is arranged for determining a signal receiving quality of the first signal received by the first wireless device, and accordingly generating a determining result. The executing unit is coupled to the determining device, and is arranged for selecting a target coexistence mechanism, which is shared by the first wireless device and the second wireless device, from a plurality of candidate coexistence mechanisms by referring to the determining result.

According to another exemplary embodiment of the present invention, a method for sharing a first wireless communication device and a second wireless communication device of a communication system is provided. The first wireless device is arranged for receiving a first signal, the second wireless device is arranged for transmitting a second signal, where the first wireless device and the second wireless device conforming to different communication standards, respectively. The method includes the following steps: determining a signal receiving quality of the first signal received by the first wireless device, and accordingly generating a determining result; and selecting a target coexistence mechanism, which is shared by the first and second wireless devices, from a plurality of candidate coexistence mechanisms by referring to the determining result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
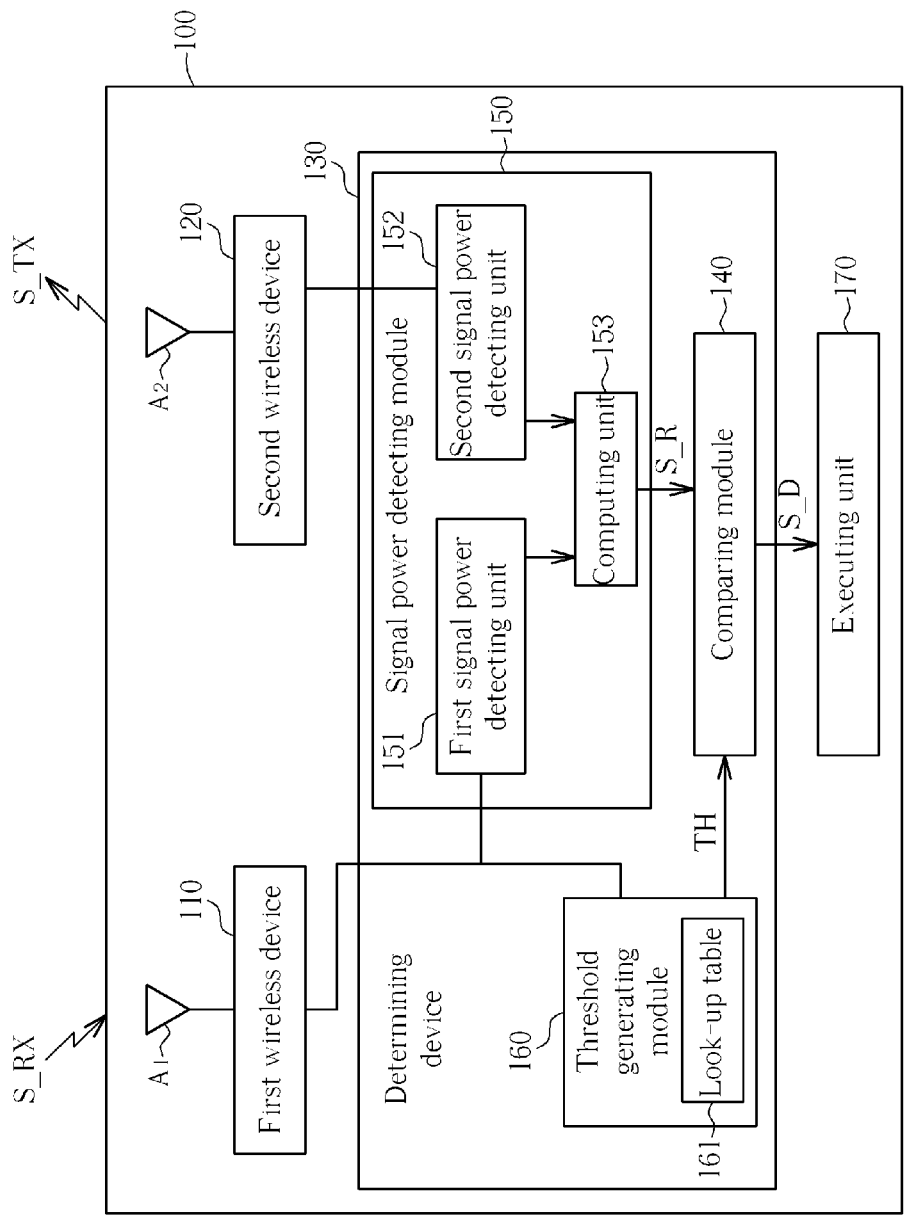
FIG. 1 is a diagram of a wireless communication system according to an embodiment of the present invention.

Please refer to FIG. 1. FIG. 1 is a diagram of a wireless communication system 100 according to an embodiment of the present invention. The wireless communication system 100 may include, but is not limited to, a first wireless device 110, a second wireless device 120, a determining device 130, and an executing unit 170. When the first wireless device 110 is under a receiving mode, the first wireless device 110 is arranged for receiving a first signal S_RX. When the second wireless device 120 is under a transmitting mode, the second wireless device 120 is arranged for transmitting a second signal S_TX. Herein the first wireless device 110 and the second wireless device 120 conform to different communication standards, respectively. For example, in this embodiment, the first wireless device 110 may be a wireless LAN device, and the second wireless device 120 may be a blue-tooth device. In another embodiment, the first wireless device 110 may be a blue-tooth device, and the second wireless device 120 may be a wireless LAN device, but this should not be considered as limitation of the present invention.

As shown in FIG. 1, the determining device 130 is coupled to the first wireless device 110 and the second wireless device 120. When the first signal S_RX is received by the first wireless device 110 and the second signal S_TX is transmitted from the second wireless device 120, the determining device 130 is arranged for determining whether a signal receiving quality of the first signal S_RX received by the first wireless device 110 meets requirements of the wireless communication system 100, and accordingly generating a determining result S_D. In this embodiment, the signal receiving quality can be implemented by a signal-to-noise ratio (SNR) of the first signal S_RX, but the present invention is not limited to this only. For example, in other embodiments, the signal receiving quality can be implemented by adopting accuracy rate of a data decoding.

In the following descriptions, how the determining device 130 generates the determining result S_D will be illustrated in detail. Please keep referring to FIG. 1. The determining device 130 may include a comparing module 140, a signal power detecting module 150, and a threshold generating module 160. The signal power detecting module 150 is coupled to the first wireless device 110 and the second wireless device 120, and is arranged for generating a signal power detecting result S_R (such as, a signal-to-noise ratio, SNR) according to the first signal S_RX and the second signal S_TX. Please note that, during the process of calculating the SNR, the power of the first signal S_RX represents the signal component, while the power of the second signal S_TX and the difference between an isolation degree between the first wireless device 110 and the second wireless device 120 represent the noise component.

In this embodiment, the signal power detecting module 150 may further include a first signal power detecting unit 151, a second signal power detecting unit 152, and a computing unit 153. The first signal power detecting unit 151 is coupled to the first wireless device 110, and is arranged for detecting a first signal power R (such as, a Received Signal Strength Indication, RSSI) of the first signal S_RX when the first signal S_RX is received by the first wireless device 110. The second signal power detecting unit 152 is coupled to the second wireless device 120, and is arranged for detecting a second signal power T of the second signal S_TX when the second signal S_TX is transmitted from the second wireless device 120. The computing unit 153 is coupled to the first signal power detecting unit 151 and the second signal power detecting unit 152, and is arranged for calculating the signal power detecting result S_R (such as, the SNR) according to the first signal power R, the second signal power T, and an isolation degree IS between the first wireless device 110 and the second wireless device 120. For example, a power of an interference signal, marked as IP, can be first calculated by the computing unit 153 according to the second signal power T and the isolation degree IS, which can be expressed by the following equation: IP=T−IS. After that, the signal power detecting result S_R can be generated by the computing unit 153 according to the first signal power R and the power of the interference signal marked as IP, which can be expressed by the following equation: S_R=R/IP.

Furthermore, the threshold generating module 160 is coupled to the first wireless device 110 and the comparing module 140, and is arranged for determining a signal quality threshold TH according to the first signal S_RX. The meaning of the signal quality threshold TH is that: a minimum value of the required SNR for the first signal S_RX when the first wireless device 110 is under the current transmission rate. Please note that, the threshold generating module 160 may include a look-up table 161. In one embodiment, if the first wireless device 110 is a wireless LAN device, the threshold generating module 160 may gather statistics of a data receiving rate of the first signal S_RX of the first wireless device 100 every other period of time, then determine the signal quality threshold TH by searching the look-up table 161 according to the data receiving rate of the first signal S_RX, and output the signal quality threshold TH to the comparing module 140. In another embodiment, if the first wireless device 110 is a blue-tooth device, the threshold generating module 160 may determine the signal quality threshold TH by searching the look-up table 161 according to a current service mode (such as, mono channel or stereo channel), and then output the signal quality threshold TH to the comparing module 140.

In addition, the comparing module 140 is coupled to the signal power detecting module 150 and the threshold generating module 160, and is arranged for comparing the signal power detecting result S_R with the signal quality threshold TH in order to generate the determining result S_D. The executing unit 140 is coupled to the determining device 130. Therefore, when the determining result S_D indicates that the signal receiving quality reaches the signal quality threshold TH of the first wireless device 110, which means the current signal quality is good, the executing unit 140 may determine to maintain the current coexistence mechanism (such as, a coexistence mechanism allowing the second wireless device 120 to transmit the second signal S_TX and the first wireless device to receive the first signal S_RX simultaneously) in order to sustain transfer rates of both the first wireless device 110 and the second wireless device 120. On the other hand, when the determining result S_D indicates that the signal receiving quality does not reach the signal quality threshold TH, which means the current signal quality is not good, the executing unit 140 may select a target coexistence mechanism from a plurality of candidate coexistence mechanisms including an adaptive frequency hopping (AFH) coexistence mechanism, a channel skipping coexistence mechanism, a time division multiplexing (TDM) coexistence mechanism, and a hybrid coexistence mechanism, such that the target coexistence mechanism can be shared by the first wireless device 110 and the second wireless device 120.

Please note that, in the implementation, the wireless communication system 100 will select one from an adaptive frequency hopping (AFH) coexistence mechanism, a channel skipping coexistence mechanism, a time division multiplexing (TDM) coexistence mechanism, and a hybrid coexistence mechanism as the target coexistence mechanism (i.e., the default coexistence mechanism of the wireless communication system 100) in advance, which can be used when the signal quality is not good enough. For example, in this embodiment, the wireless communication system 100 determines the TDM coexistence mechanism as the target coexistence mechanism to be executed when the signal quality is not good enough in advance. As a result, when the determining result S_D indicates that the current signal quality is good, the executing unit 140 determines the target coexistence mechanism as a coexistence mechanism allowing the second wireless device 120 to transmit the second signal S_TX and the first wireless device 110 to receive the first signal S_RX simultaneously in order to sustain transfer rates of both the first wireless device 110 and the second wireless device 120. On the other hand, when the determining result S_D indicates that the current signal quality is not good enough, the executing unit 140 may execute the TDM coexistence mechanism. In one word, when the current signal quality of the wireless communication system 100 is good, the coexistence mechanism allowing the second wireless device 120 to transmit the second signal S_TX and the first wireless device 110 to receive the first signal S_RX simultaneously is executed; and when the current signal quality of the wireless communication system 100 is not good, the TDM coexistence mechanism is executed.

Please note that, in this embodiment, the first wireless device 110 is coupled to a first antenna A1, and the second wireless device 120 is coupled to a second antenna A2 different from the first antenna A1, wherein a distance between the first antenna A1 and the second antenna A2 determines the isolation degree between the first wireless device 110 and the second wireless device 120, and the distance is directly proportional to the isolation degree. In other words, if the distance between the first antenna A1 and the second antenna A2 gets longer, the IS gets larger and the power of the interference signal IP gets smaller. Hence, the placements of the first antenna A1 and the second antenna A2 on the printed circuit board (PCB) determine the isolation degree IS between the first wireless device 110 and the second wireless device 120, wherein the value of the isolation degree IS will be recorded in a memory (not shown) of the wireless communication system 100.

Figure 2:
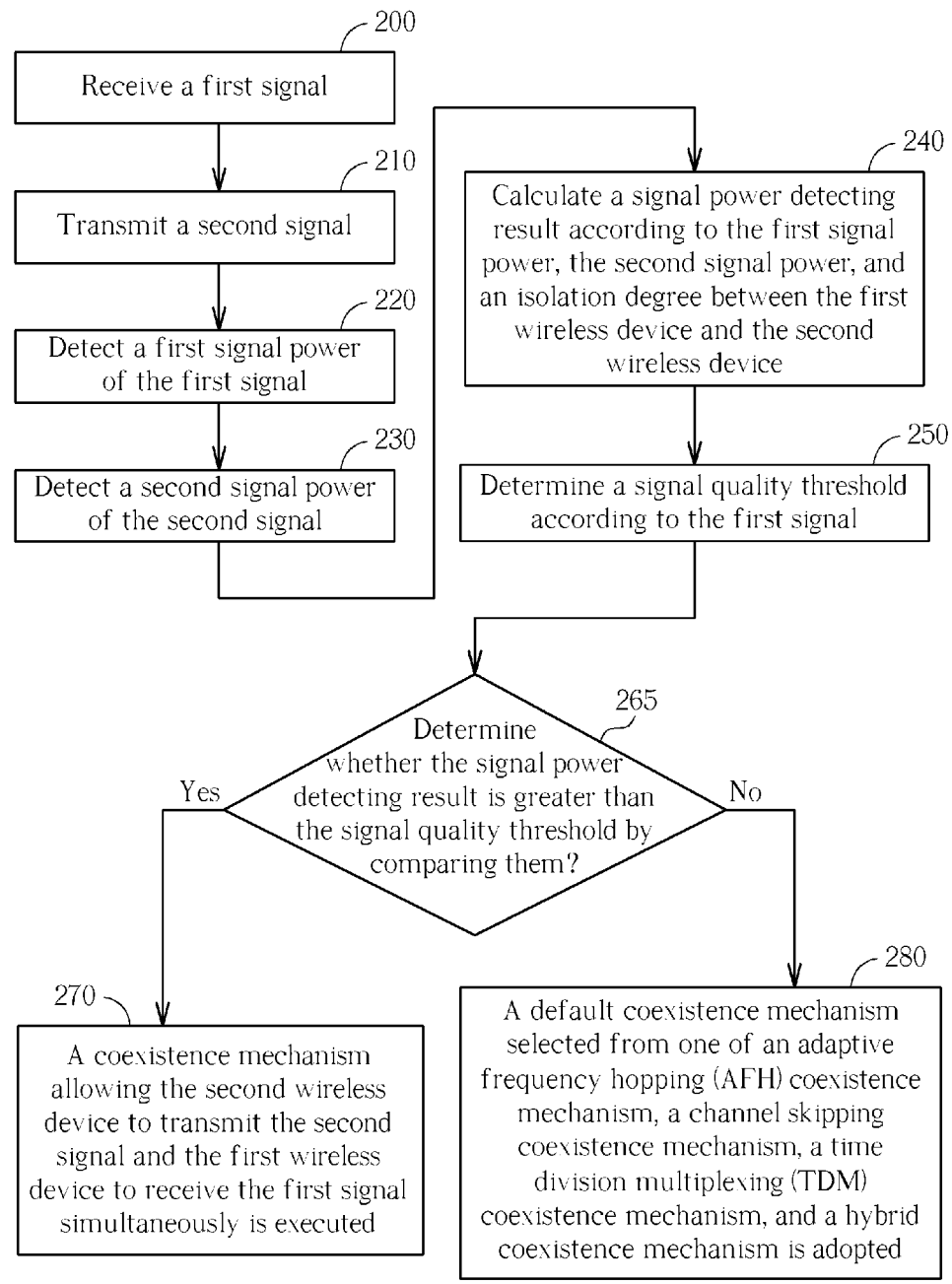
FIG. 2 is a flowchart illustrating a method for sharing a plurality of wireless devices in a wireless communication system according to an exemplary embodiment of the present invention.

Please refer to FIG. 2. FIG. 2 is a flowchart illustrating a method for sharing a plurality of wireless devices in a wireless communication system according to an exemplary embodiment of the present invention. Please note that the following steps are not limited to be performed according to the exact sequence shown in FIG. 2 if a roughly identical result can be obtained. The method includes, but is not limited to, the following steps:

Step 200: Receive a first signal.
Step 210: Transmit a second signal.
Step 220: Detect a first signal power of the first signal.
Step 230: Detect a second signal power of the second signal.
Step 240: Calculate a signal power detecting result according to the first signal power, the second signal power, and an isolation degree between the first wireless device and the second wireless device.
Step 250: Determine a signal quality threshold according to the first signal.
Step 265: Determine whether the signal power detecting result is greater than the signal quality threshold by comparing them. If yes, go to step 270; otherwise, go to step 280.
Step 270: A coexistence mechanism allowing the second wireless device to transmit the second signal and the first wireless device to receive the first signal simultaneously is executed.
Step 280: A default coexistence mechanism (or a target coexistence mechanism) selected from one of an adaptive frequency hopping (AFH) coexistence mechanism, a channel skipping coexistence mechanism, a time division multiplexing (TDM) coexistence mechanism, and a hybrid coexistence mechanism is adopted.

How each element operates can be known by collocating the steps shown in FIG. 2 and the elements shown in FIG. 1, and further description is omitted here for brevity. In addition, the steps of the abovementioned flowchart are merely practicable embodiments of the present invention, and in no way should be considered as limitations of the scope of the present invention. The method can include other intermediate steps or several steps can be merged into a single step without departing from the spirit of the present invention.

Figure 3:
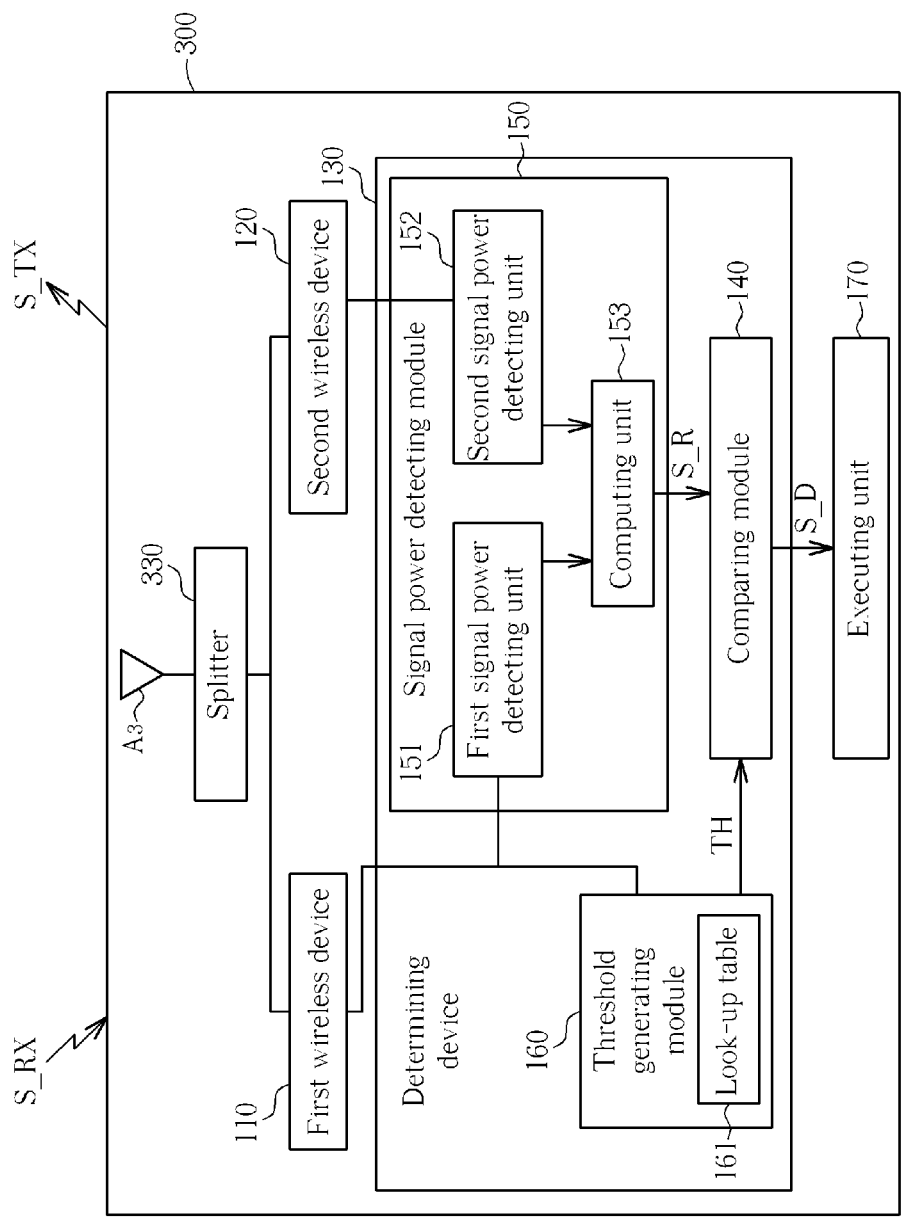
FIG. 3 is a diagram of a wireless communication system according to another embodiment of the present invention.

Please refer to FIG. 3. FIG. 3 is a diagram of a wireless communication system 300 according to another embodiment of the present invention. The architecture of the wireless communication system 300 is similar to that of the wireless communication system 100 shown in FIG. 1, and the major difference between them is that: a shared antenna A3 is adopted in the wireless communication system 300, and the wireless communication system 300 further includes a splitter 330 for determining the isolation degree IS between the first wireless device 110 and the second wireless device 120. As a result, the computing unit 153 is able to calculate the power of the interference signal, which is marked as IP, according to the isolation degree IS and the second signal S_TX, as well. Since the operations of the wireless communication system 300 are similar to the operations of the wireless communication system 100. Those skilled in the art will easily appreciate the operations of the wireless communication system 300 after reading the abovementioned description related to the wireless communication system 100, and further description is omitted here for brevity.

In summary, the present invention provides wireless communication architecture for determining the target coexistence mechanism based on a signal receiving quality of the received signals. As a result, when the signal receiving quality does not reach the signal quality threshold TH, which means the current signal quality is not good, a target coexistence mechanism is adopted, which allows a plurality of wireless devices (such as, wireless LAN devices and blue-tooth devices) of a wireless communication system to transmit and receive signals simultaneously and can be stabilized quickly without sacrificing transmission rates.

Those skilled in the art will readily observe that numerous modifications and alterations of the device and method may be made while retaining the teachings of the invention.

What is claimed is:

1. A wireless communication system, comprising:
a first wireless device, arranged for receiving a first signal;
a second wireless device, arranged for transmitting a second signal, wherein the first wireless device and the second wireless device conform to different communication standards, respectively;
a determining device, coupled to the first wireless device and the second wireless device, arranged for determining a signal receiving quality of the first signal received by the first wireless device, and accordingly generating a determining result; and
an executing unit, coupled to the determining device, arranged for selecting a target coexistence mechanism, which is shared by the first wireless device and the second wireless device, from a plurality of candidate coexistence mechanisms by referring to the determining result, wherein the determining device comprises: a signal power detecting module, coupled to the first wireless device and the second wireless device, arranged for generating a signal power detecting result according to the first signal and the second signal; and a comparing module, coupled to the signal power detecting module, arranged for comparing the signal power detecting result with a signal quality threshold in order to generate the determining result.

2. The wireless communication system of claim 1, wherein when the determining result indicates that the signal receiving quality does not reach a signal quality threshold of the first wireless device, the target coexistence mechanism is a default coexistence mechanism of the wireless communication system.

3. The wireless communication system of claim 2, wherein the default coexistence mechanism comprises one of an adaptive frequency hopping (AFH) coexistence mechanism, a channel skipping coexistence mechanism, a time division multiplexing (TDM) coexistence mechanism, and a hybrid coexistence mechanism.

4. The wireless communication system of claim 2, wherein when the determining result indicates that the signal receiving quality reaches the signal quality threshold of the first wireless device, the target coexistence mechanism is a coexistence mechanism allowing the second wireless device to transmit the second signal and the first wireless device to receive the first signal simultaneously.

5. The wireless communication system of claim 1, wherein the signal power detecting module comprises: a first signal power detecting unit, coupled to the first wireless device, arranged for detecting a first signal power of the first signal; a second signal power detecting unit, coupled to the second wireless device, arranged for detecting a second signal power of the second signal; and a computing unit, coupled to the first signal power detecting unit and the second signal power detecting unit, arranged for calculating the signal power detecting result according to the first signal power, the second signal power, and an isolation degree between the first wireless device and the second wireless device.

6. The wireless communication system of claim 5, wherein the first wireless device is coupled to a first antenna, the second wireless device is coupled to a second antenna, and a distance between the first antenna and the second antenna determines the isolation degree between the first wireless device and the second wireless device.

7. The wireless communication system of claim 5, further comprising: a shared antenna, coupled to the first wireless device and the second wireless device, arranged for receiving and transmitting the first signal of the first wireless device and the second signal of the second wireless device; and a splitter, coupled to the shared antenna, arranged for separating the first signal of the first wireless device from the second signal of the second wireless device; wherein the splitter determines the isolation degree between the first wireless communication device and the second wireless device.

8. The wireless communication system of claim 1, wherein the determining device further comprises: a threshold generating module, coupled to the first wireless device and the comparing module, arranged for determining the signal quality threshold according to the first signal.

9. The wireless communication system of claim 1, wherein the threshold generating module comprises a look-up table, and the threshold generating module determines the signal quality threshold by searching the look-up table according to a data receiving rate of the first signal.

10. The wireless communication system of claim 8, wherein the threshold generating module comprises a look-up table, and the threshold generating module determines the signal quality threshold by searching the look-up table according to a service mode of the first signal.

11. The wireless communication system of claim 1, wherein one of the first wireless device and the second wireless device is a blue-tooth device, and the other one of the first wireless device and the second wireless device is a wireless LAN device.

12. A method for sharing a first wireless communication device and a second wireless communication device of a communication system, the first wireless device arranged for receiving a first signal, the second wireless device arranged for transmitting a second signal, the first wireless device and the second wireless device conforming to different communication standards, respectively, and the method comprises the following steps:

determining a signal receiving quality of the first signal received by the first wireless device, and accordingly generating a determining result; and selecting a target coexistence mechanism, which is shared by the first and second wireless devices, from a plurality of candidate coexistence mechanisms by referring to the determining result wherein the step of determining the signal receiving quality of the first signal received by the first wireless device, and accordingly generating the determining result comprises: generating a signal power detecting result according to the first signal and the second signal; and comparing the signal power detecting result with a signal quality threshold in order to generate the determining result.

13. The method of claim 12, wherein when the determining result indicates that the signal receiving quality does not reach a signal quality threshold of the first wireless device, the target coexistence mechanism is a default coexistence mechanism of the wireless communication system.

14. The method of claim 13, wherein the default coexistence mechanism comprises one of an adaptive frequency hopping (AFH) coexistence mechanism, a channel skipping coexistence mechanism, a time division multiplexing (TDM) coexistence mechanism, and a hybrid coexistence mechanism.

15. The method of claim 13, wherein when the determining result indicates that the signal receiving quality reaches the signal quality threshold of the first wireless device, the target coexistence mechanism is a coexistence mechanism allowing the second wireless device to transmit the second signal and the first wireless device to receive the first signal simultaneously.

16. The method of claim 12, wherein the step of generating the signal power detecting result according to the first signal and the second signal comprises: detecting a first signal power of the first signal; detecting a second signal power of the second signal; and calculating the signal power detecting result according to the first signal power, the second signal power, and an isolation degree between the first wireless device and the second wireless device.

17. The method of claim 12, wherein the step of comparing the signal power detecting result with the signal quality threshold in order to generate the determining result comprises: determining the signal quality threshold according to the first signal.

* * * * *